June 17, 1969   W. E. SHEARER   3,449,853
ARTIFICIAL FISH BAIT
Filed May 12, 1967
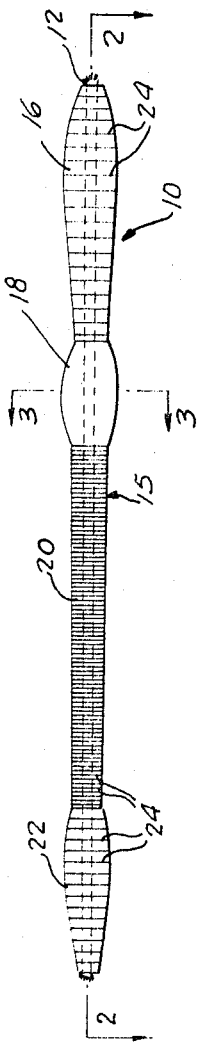
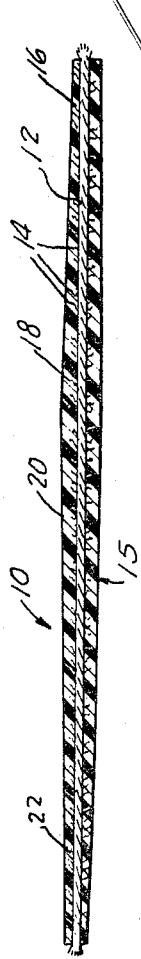
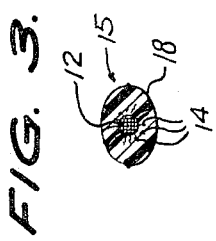
INVENTOR.
WILLIAM E. SHEARER,
BY
Berman, Davidson & Berman
ATTORNEYS.

United States Patent Office 3,449,853
Patented June 17, 1969

3,449,853
ARTIFICIAL FISH BAIT
William E. Shearer, Little Rock, Ark., assignor to Carl R. Cordell, Jr., Hot Springs, Ark.
Filed May 12, 1967, Ser. No. 638,046
Int. Cl. A01k 85/00
U.S. Cl. 43—42.24                                4 Claims

ABSTRACT OF THE DISCLOSURE

An artificial bait for fish simulating a worm-like creature formed of a spine-like length of soft, limp yarn of wool or similar fibers, surrounded by an elongate body formed of soft plastic adhered only to the yarn surface and protruding fibers thereof. The body is shaped, colored and marked to resemble a worm, eel or snake, and the yarn forms a limp, bone-like supporting member for the body. The yarn extends axially and continuously through the body and is exposed at each end thereof.

---

This invention relates to fishing lures in general, and more particularly to an improved artificial lure which simulates a worm, eel, or snake, or other worm-like creature.

Conventional fish lures are available which reasonably give the appearance of the creature which they are supposed to resemble, for example, a worm. Such conventional lures, however, are subject to many disadvantages. Usually the materials from which these lures are made, even if flexible, are hard to the touch or feel. Many fish have very sensitive mouths and can, upon receiving the lure in the mouth, immediately recognize the unusual hardness of the artificial lure as being unlike their natural food. Accordingly, the fish will quickly release the lure before taking the hook attached thereto. Secondly, conventional lures, when made of plastic, become hardened with age so that their useful life for attracting fish strikes is, thereby, shortened. Thirdly, conventional lures, being usually inflexible, tend to stay in their fabricated shapes and do not change shapes, or otherwise adopt movements, while lying in or being drawn through the water, which correspond to natural movements of the creatures which they represent.

It is a primary purpose of the present invention to provide an improved artificial bait, or lure, which obviates the above briefly described disadvantages of conventional lures.

A highly important object of the invention is to provide an artificial bait formed of very soft plastic so as to present a soft feel, or taste, to a striking fish, and thereby continue to deceive the fish until it is completely impaled or hooked.

Another object of the invention is to provide an improved artificial bait, having the above described characteristics, in which is incorporated a limp length of yarn extending from head to tail of the lure body, said yarn functioning to hold the soft plastic together, to lock the soft plastic body to the yarn backbone, and to thereby provide the softness and flexibility required of the lure to simulate the actions of a real worm as it moves in water.

Still another object of the invention is to provide a new and improved fish bait, having the above described characteristics, which can be readily made, and is economical to fabricate, can be easily applied to a hook, and is certain to stay on the hook once it is placed thereon.

The novel features that are considered characteristic of the invention are set forth with particularity in the appended claims. The invention, itself, however, both as to its organization and its method of operation, together with additional objects and advantages thereof, will best be understood from the following description of a specific embodiment when read in conjunction with the accompanying drawing, wherein like reference characters indicate like parts throughout the several figures in which:

FIG. 1 is a plan view of an artificial bait according to the invention and which simulates a blood worm.

FIG. 2 is a longitudinal cross-sectional view taken on line 2—2 of FIG. 1 and looking in the direction of the arrows.

FIG. 3 is a cross-sectional view taken on line 3—3 of FIG. 1, and

FIG. 4 is a perspective view of the artificial bait in use applied to a hook and leader of a fishing line.

Referring now more particularly to the drawing, there is shown an artificial bait according to the invention which simulates a blood worm. The lure, generally referenced by numeral 10, has a central, limp backbone 12 formed of a length of yarn extending from head to tail of the worm. Preferably, the yarn is of soft wool of the type used for knitting and comprising a plurality of fibers slightly twisted into strands, and a plurality of such strands then twisted, as on a spinning machine, into the yarn. The yarn includes individual fibers 14 protruding from the surface in approximately radial directions and along the entire length of the yarn. If desired, the yarn may be made of cotton, silk, linen, and other fibrous materials so long as the finished yarn is very flexible and limp. Adhered about the yarn, in any suitable manner, is a generally tubular body 15 formed of plastic and which is adhered to the surface only of the yarn 12 and to the surfaces of its protruding filaments 14. Such adherences may be obtained by molding under pressure, by dipping, by spraying, by joint extrusion, or by any other known method of applying a coating of requisite thickness and shape which will strongly adhere to the yarn and interlock with the fibers 14 without penetrating or impregnating the entire cross-section of the yarn. Any such impregnation would be unsuitable in tending to rigidify, or reduce the flexibility, of the yarn backbone.

Desirably, the body 15 is shaped to conform substantially to the shape of the worm-like creature being simulated, and, therefore, is formed with a flat oval head 16, a similarly flat oval neck 18, a cylindrical body portion 20, and a flat oval tail 22. The head, body portion and tail have molded in their outer surfaces parallel ring marks 24 simulating the markings of a blood worm.

In forming the body 15 many classes of plastics are suitable. To obtain the requisite degree of softness, it has been found that vinyl polymers and vinyl copolymers are preferable thermoplastic materials, particularly polyvinyl chloride. To the plastic resin is added a suitable plasticizer which increases the softness of the hardened, or cured, material. A preferred plasticizer is dioctyl phthalate, but other classes of plasticizers such as the adipates, oleoates, stearates and sebacates, etc., are usable. The important feature of the invention rising out of the softness of the bait body makes it highly important to use a greater proportion of plasticizer in formulating the plastic body than conventionally used.

In mixing the plastic to make the body 15 a stabilizer and a colorant are also used. A great many substances are suitable for these purposes. It has been found that an organotin such as dibutyltin mercaptide, a dibutyltin mercapto ester, a dibutyltin maleate and dioctyltin are suitable for use as a stabilizer. The colorant may be chrome tin, cadmium mercury, cadmium sulfoselenide or other suitable materials for providing the red coloring of the simulated blood worm. Other colorants may, of course, be used when the lure simulates creatures of different color.

As previously indicated, the plastic material, when bonded to the surfaces only of the yarn 12 and to the protruding individual fibers 14, is much softer than conventional plastic, presenting a very soft touch, or feel, to the mouth of the fish, and being very limp and flexible with only a slight degree of resilience. The bonding is sufficiently strong to prevent pulling the yarn backbone longitudinally through or laterally from the finished lure and the interlocking of the fibers with the plastic serves to hold the soft plastic body together in one piece in spite of its softness.

To use the artificial bait the body 15 is merely impaled on the barb 26 of a fishhook 28 which is supported on a leader 30 of a fishing line 32 having a conventional weight 34. Thus, the normal mode of applying real worms to fishhooks is used. Of course, if desired, the lure may be partially coiled on the hook, or the hook may be arranged to pierce the lure at spaced intervals so as to give it a serpentine shape. During fishing, the artificial worm rests, moves, and acts in the water just like a real worm would in the same environment because of its limpness, flexibility and slight resilience. When a fish strikes the bait, the touch or feel of the simulated worm in his mouth will be the same as that of a real worm, and the fish will take the hook more readily than if he were striking at a hard and resilient lure of the same shape. When a caught fish is removed from the hook, the artificial bait can be reused again and again because it retains softness and useful life much longer than would a harder lure.

While it has been emphasized that it is preferred to adhere the plastic to the yarn surface and protruding filaments, under certain conditions it is possible to penetrate and impregnate part or all of the body of the yarn without unduly rigidifying or reducing the flexibility of the completed lure. In such circumstances, and whether by changing the plastic or the mode of adhering the plastic, it is considered that a partially or fully impregnated yarn falls within the spirit and scope of the invention.

What is claimed is:

1. An artificial bait for fish comprising a length of limp yarn and forming a spine-like supporting member, and an elongate body of soft plastic shaped to resemble a worm-like creature surrounding and strongly adhered to said yarn thereby producing a flexible, slightly resilient bait facsimile which truly imitates said worm-like creature in action and softness of feel in the mouth of a fish, as well as in appearance, said plastic body being adhered only to the yarn surface and protruding fibers thereof without substantially impregnating the yarn, said yarn extending axially and continuously through said body and exposed at each end thereof.

2. An artificial bait according to claim 1 wherein said body includes a central portion of annular cross-section and flattened head and tail portions of oval cross-section, the outer surface of said body having spaced parallel rings molded therein to simulate the skin markings of said worm-like creature.

3. An artificial bait according to claim 1 wherein said body is formed of a plastic, a plasticizer, a stabilizer and a colorant, the proportion of said plasticizer being of high order so as to yield greater softness in the condition of the body.

4. An artificial bait according to claim 3 wherein said plastic is selected from the group consisting of vinyl polymers and vinyl copolymers, said plasticizer is selected from the group consisting of phthalates, adipates, oleates, stearates, and sebacates, and said stabilizer is an organotin selected from the group consisting of dibutyltin mercaptide, dibutyltin mercapto esters, dibutyltin maleates and dioctyltin.

References Cited
UNITED STATES PATENTS

| | | | |
|---|---|---|---|
| 2,501,723 | 3/1950 | Harvey | 43—42.28 |
| 2,563,522 | 8/1951 | Fisher | 43—42.24 |
| 2,603,025 | 7/1952 | Brown | 43—42.28 X |
| 2,676,160 | 4/1954 | Ochoa. | |
| 2,979,850 | 4/1961 | Lund | 43—42.24 |
| 3,068,604 | 12/1962 | Nyberg | 43—42.24 X |
| 3,147,564 | 9/1964 | Messler | 43—42.24 X |
| 3,165,858 | 1/1965 | Rutter | 43—42.24 X |
| 3,349,513 | 10/1967 | Jeff | 43—42.24 X |

SAMUEL KOREN, *Primary Examiner.*

J. H. CZERWONKY, *Assistant Examiner.*

U.S. Cl. X.R.

43—42.34